(12) United States Patent
Choi

(10) Patent No.: US 6,385,041 B1
(45) Date of Patent: May 7, 2002

(54) ELECTRONIC DEVICE WITH BATTERY PACK

(75) Inventor: Phil-Kyu Choi, Suwon (KR)

(73) Assignee: Samsung Electronics Co., LTD, Suwon (KR)

( * ) Notice: Subject to any disclaimer, the term of this patent is extended or adjusted under 35 U.S.C. 154(b) by 0 days.

(21) Appl. No.: 09/489,924

(22) Filed: Jan. 24, 2000

(30) Foreign Application Priority Data

Jan. 22, 1999 (KR) .............................................. 95-1999

(51) Int. Cl.[7] .............................. G06F 1/16; H05K 5/00
(52) U.S. Cl. ..................... 361/686; 361/683; 312/223.1; 16/221; D14/107
(58) Field of Search ................................ 361/680, 681, 361/683, 686; 16/221–392; D14/106, 107; 235/375, 462, 472.01; 312/223.1, 223.2

(56) References Cited

U.S. PATENT DOCUMENTS

| | | | |
|---|---|---|---|
| 5,030,128 A | * 7/1991 | Herron et al. | 361/686 |
| 5,422,784 A | * 6/1995 | Wakahara et al. | 361/680 |
| D370,666 S | * 6/1996 | Bovio et al. | D14/106 |
| 5,583,744 A | * 12/1996 | Oguchi et al. | 361/683 |
| 5,721,668 A | * 2/1998 | Barrus et al. | 361/683 |
| 5,901,035 A | 5/1999 | Foster et al. | |
| 5,905,550 A | * 5/1999 | Ohgami et al. | 361/681 |
| 6,002,583 A | * 12/1999 | Shoji et al. | 361/683 |
| 6,175,488 B1 | * 1/2001 | Seto et al. | 361/683 |
| 6,191,941 B1 | * 2/2001 | Ito et al. | 361/683 |
| 6,233,141 B1 | * 5/2001 | Lee et al. | 361/683 |

* cited by examiner

Primary Examiner—Leo P. Picard
Assistant Examiner—Lisa Lea-Edmonds
(74) Attorney, Agent, or Firm—Robert E. Bushnell, Esq.

(57) ABSTRACT

The present invention relates to an electronic device with a battery pack and, more particularly to lap-top type or note book type computers with a batter pack. An electronic device comprising a main body including an upper housing and a lower housing, a display panel attached pivotally on the upper housing of the main body, a pair of hinge portions disposed at the rear portion of the main body and spaced at each other, wherein each of opposite sides of hinge portions has at least one protrusion member, and a battery pack incorporated to be detachable between hinge portions, wherein at least one protrusion member is formed to be coupled securely to the hinge portions at each side end of the battery pack, and the protrusion members are engaged with the protrusion member when the battery pack is coupled to the portable computer. The battery pack is designed for easy manufacturability and simplicity of components for attachment and detachment of the battery pack from the main body of the portable computer.

20 Claims, 5 Drawing Sheets

ELECTRONIC DEVICE WITH BATTERY PACK

CLAIM FOR PRIORITY

This application makes reference to, incorporates the same herein, and claims all benefits accruing under 35 U.S.C. §119 from an application for Electronic Device With Battery Pack earlier filed in the Korean Industrial Property Office on the of Jan. 22, 1999, and there duly assigned Serial No. 1995/1999, a copy of which application is annexed hereto.

1. Field of the Invention

The present invention relates to an electronic device with a battery pack and, more particularly to lap-top type or note book type computers with a batter pack.

2. Description of the Related Art

In recent years, because of the fast development in electronic technology portable computer, more particularly lap-top type or note book type computers become more and more popular. The main advantage of portable computer is that they can be conveniently carried with oneself for use at anytime and anywhere.

A portable computer comprises a flat box-shaped housing and a pressure-sensitive tablet. The housing has a flat upper surface, at which the input screen of the tablet is exposed. The portable computer has a battery pack used as a power supply for driving other components of the portable computer, and can therefore be used in any place where a commercial power supply is not available. The battery pack is removably placed in the battery receptacle formed in the bottom of the computer housing, while placed in the housing.

However, in designing such a portable computer with an inserting type battery, one may encounter two problems. The first problem is that battery which provides a computer with necessary working voltage occupies space and the second problem is that battery increases the total weight of a computer. When AC power or car power source is utilized for a portable computer, the battery of such a portable computer becomes useless and somewhat a burden. And in recent portable computers, especially pam-top computer or lap-top computer, designing a certain space for storing a battery inside main body is very difficult.

In addition to the above mentioned problems, the engagement of the battery pack and the portable computer is not sufficient when the battery pack is directly coupled to the outer surface of the portable computer. In this case, a small impact forced on the portable computer brings the detachment of the battery pack out of the portable computer.

U.S. Pat. No. 5,901,035 for a Rotating Battery Hinge For a Notebook Computer to Foster et al discloses a battery housing movably mounted external to a computer housing. However, attachment and detachment of the battery to and from the computer requires complex mechanisms which are neither desired or easily manufacturable. In addition, Foster '035 attaches or couples the battery to a lower housing only while what is needed is to attach the battery to both the lower housing and the upper housing to produce a stronger contact between the lower housing and the upper housing of the computer and durability of the portable computer would be enhanced. What is needed is an external battery for a portable computer that uses simple and easy to manufacture means to attach and detach the battery from the computer where the battery contacts both the lower and the upper housing, squeezing them together and providing a stronger and more durable portable computer.

SUMMARY OF THE INVENTION

It is therefore an object of the present invention to provide an electronic device with a battery pack coupled to an outer surface of the electronic device capable of saving a inner space of the portable computer.

It is another object of the invention to provide an electronic device with a engagement member for incorporating the battery pack firmly.

It is yet another object to provide a battery pack for a notebook computer that resides external to the computer that is easy to manufacture and requires few parts and a simple structure to attach and detach the battery to and from the computer.

It is still yet another object to provide a battery pack that attaches to and squeezes together an upper housing and a lower housing of a portable computer to tighten the contact between the lower housing and the upper housing to result in a portable computer that is stronger and more durable, while allowing the display panel to open and close even when the battery pack is attached to the portable computer.

In order to attain the above objects, according to an aspect of the present invention, there is provided an electronic device comprising a main body including an upper housing and a lower housing, a display panel attached pivotally on the upper housing of the main body, a pair of hinge portions disposed at the rear portion of the main body and spaced at each other, wherein each of opposite sides of hinge portions has at least one protrusion member, and a battery pack incorporated to be detachable between hinge portions, wherein at least one protrusion member is formed to be coupled securely to the hinge portions at each side end of the battery pack, and the protrusion members are engaged with the protrusion member when the battery pack is coupled to the portable computer.

In the electronic device according to the invention, each of opposite sides of hinge portions has a first protrusion member and a second protrusion member, wherein the first protrusion member is formed on the upper housing and the second protrusion member is formed on the lower housing.

Furthermore, in the electronic device, a coherence of the hinge portions of the portable computer is increased when the battery pack is coupled to the portable computer.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
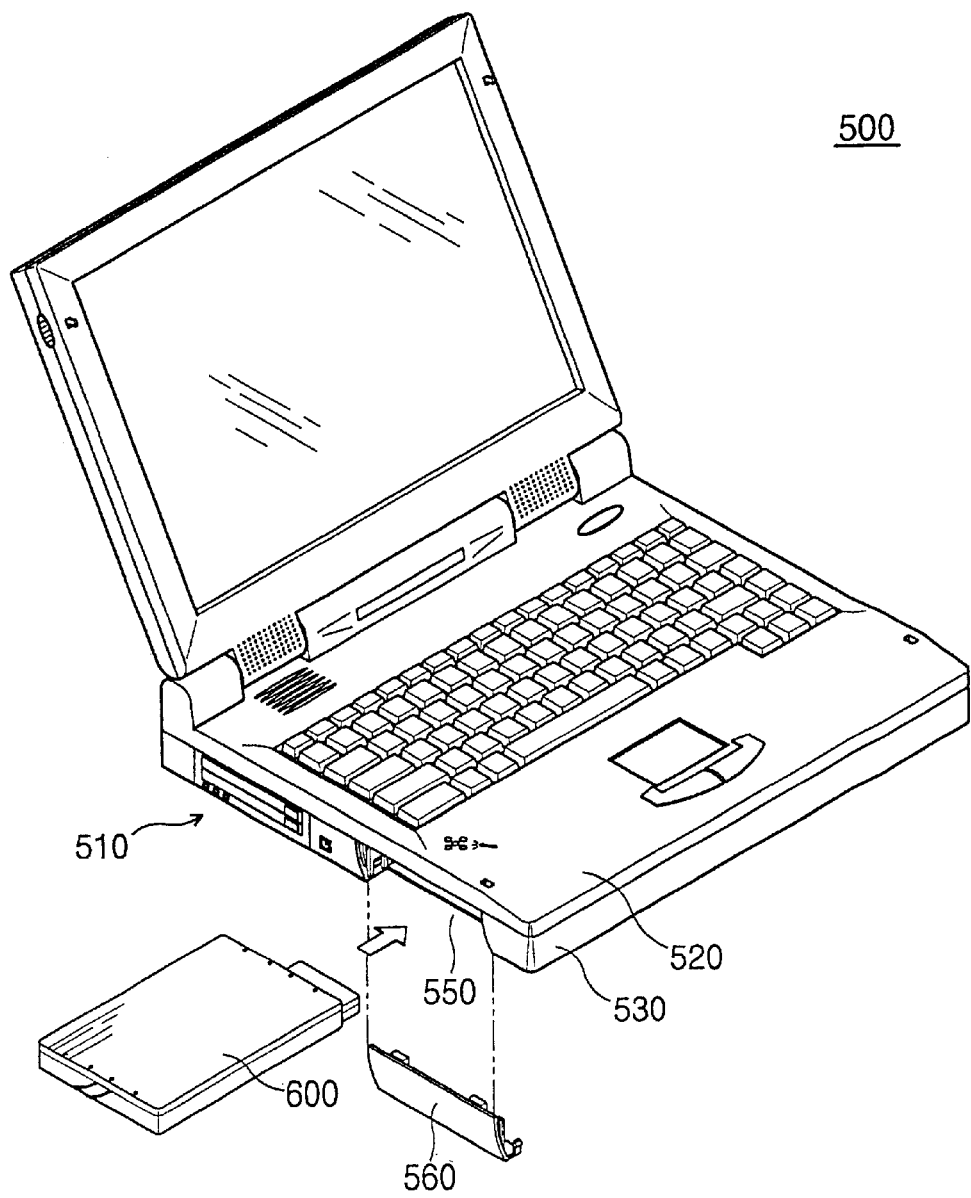
FIG. 1 is a perspective view for illustrating a portable computer with a battery receiving chamber.

FIG. 1 illustrates a portable computer with a battery. Referring to FIG. 1, a portable computer 500 comprises a main body 510. The main body 510 included a lower housing 530 and an upper housing 520. The lower housing 530 comprises a battery opening 550 at one side wall. A regular space for storing a battery is formed inside the lower housing 530. Therefore, the battery pack 600 is inserted into the lower housing 530 through the battery opening 550. After the inserting of the battery pack 600 into the lower housing 530, a battery door 560 is attached on the battery opening 550.

Figure 2:
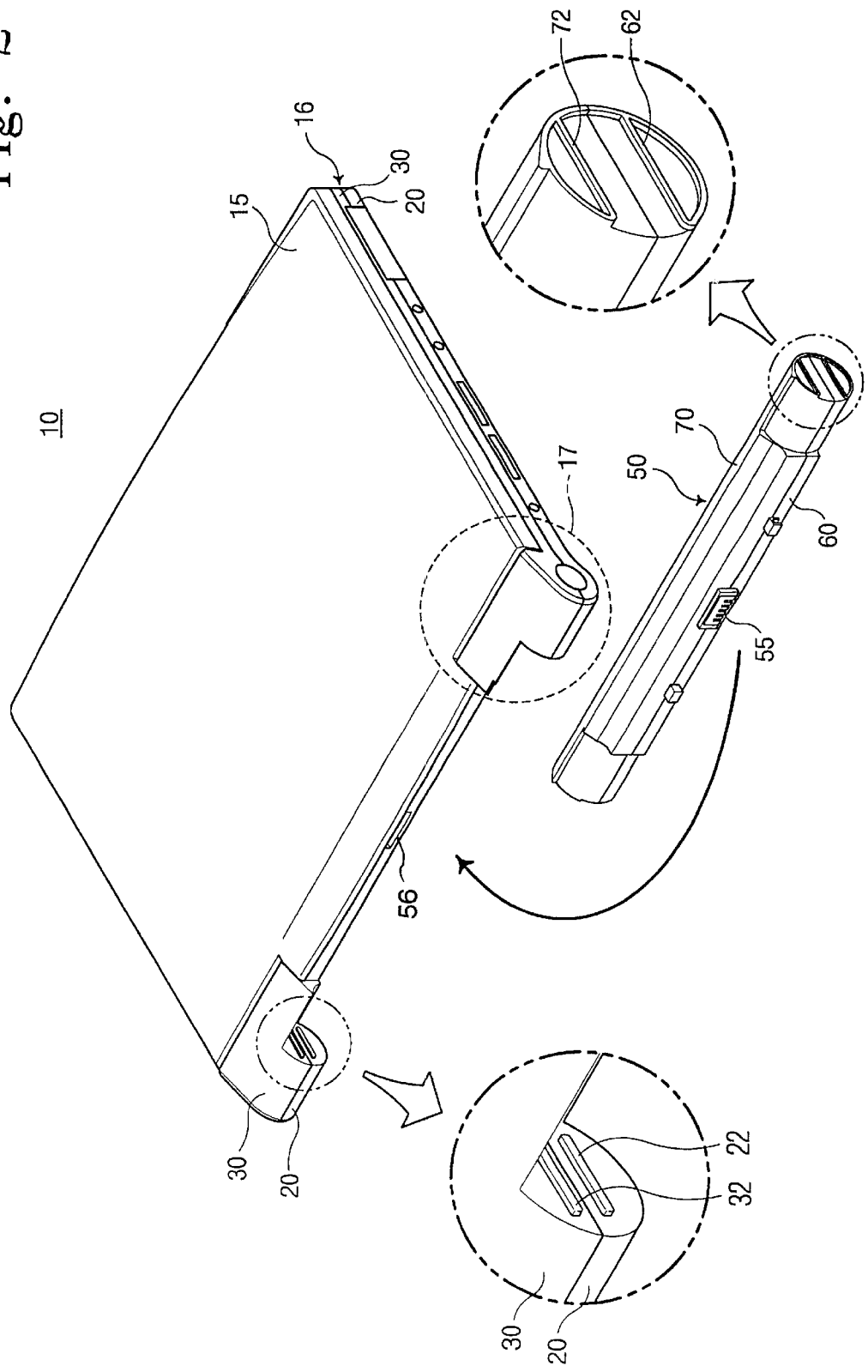
FIG. 2 is a perspective view for illustrating a portable computer with a battery coupling structure and a battery pack having a coupling member at each side end surface according to a first embodiment of a present invention.

Referring to FIG. 2, a portable computer 10 according to a first embodiment of a present invention comprises a display panel 15 and a main body 16. The main body 16 is comprised of an upper housing 30 and a lower housing 20. The display panel 15 is pivotally attached on the rear portion of the upper housing 30. A pair of hinge portion 17 disposed at the rear portion of the main body 16 is spaced at each other. Each of an opposite side of the hinge portion 17 includes two protuberance 22, 32.

A battery pack 50 including an upper battery housing 70 and a lower battery housing 60 is inserted into a space between two hinge portions 17, and coupled to the main body 16 to provide a working voltage with a main body 16. The battery pack 50 has a electrical connector 55 which makes the battery pack 50 to be connected an inner circuit board within the main body 16. On each surface of side end of the battery pack 50, two guide ribs 72, 62 are formed. A shape of the battery pack according to the first embodiment of the present invention is circular bar, then the outer surface of the ending portion of the main body 16 is almost formed a circular shape without protruding portion at certain point when the battery pack 50 is completely coupled to the main body 16 of the portable computer 10.

Figure 3:
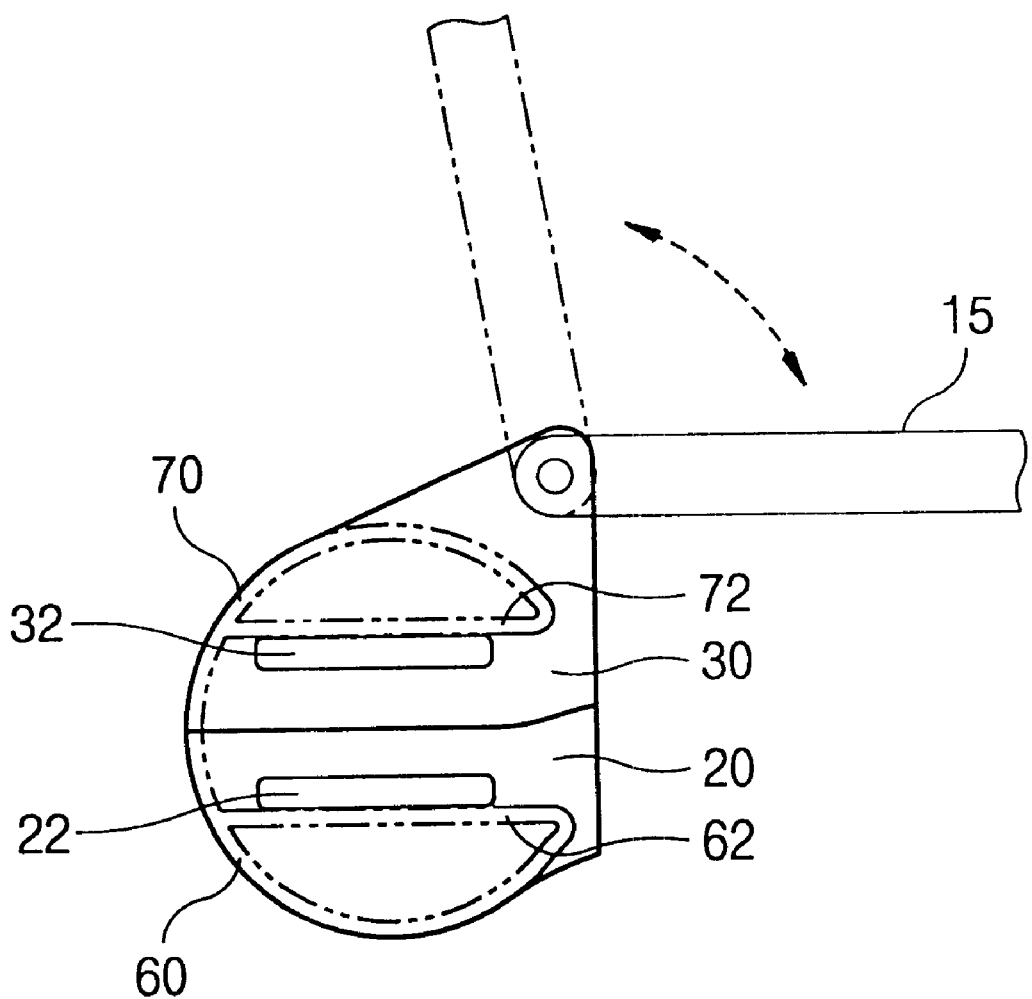
FIG. 3 is a diagram for illustrating an attachment of the battery pack to the portable computer according to the first embodiment of the present invention.

The coupled state between the battery pack 50 and the main body 16 is further explained in detail referring to FIG. 2 and FIG. 3.

When the battery pack 50 is coupled to the main body 16, two protuberance 22 and 32 are contacted with two guide ribs 72 and 62, then the guide ribs 72, 62 enforce two protuberance 22, 32 to be adhered closely to each other. Using such a coupling way, the coupling of the battery pack 50 to the main body 16 bring the adherence of the upper housing 30 and the lower housing 20, therefore a coherence of the rear portion of the portable computer 10 is increased. As may be seen in FIG. 3, a hinge shaft on which an LCD display unit rotates is located at a higher part than the battery coupling place. Therefore, when the display panel rotates, opening of a notebook computer is not influenced by whether the battery is coupled to the computer or not. The rotated hinge portion of the LCD display unit shown in FIG. 2 is rounded and is thus softly moved when the LCD display unit is opened.

In the first embodiment of the present invention, the protuberance 32 is formed on the upper housing 30 and the protuberance 22 is formed on the lower housing 20. And the guide rib 72 is formed on the upper battery housing 70 and the guide rib 62 is formed on the lower battery housing 60. In such a structure, the guide rib 72 of the battery pack 50 is contacted with a protuberance 32 and the guide rib 62 of the battery pack 50 is contacted with a protuberance 22. The length of the interval of guide rib 72 and guide rib 62 is designed according to two protuberances 32, 22 formed on the upper and lower housing. As described above, when the guide ribs 72, 62 is coupled on the hinge portion 17 of the portable computer, an engagement of the guide ribs and protuberance make the coupling state between the portable computer 10 and the battery pack 50 firm and safe.

Figure 4:
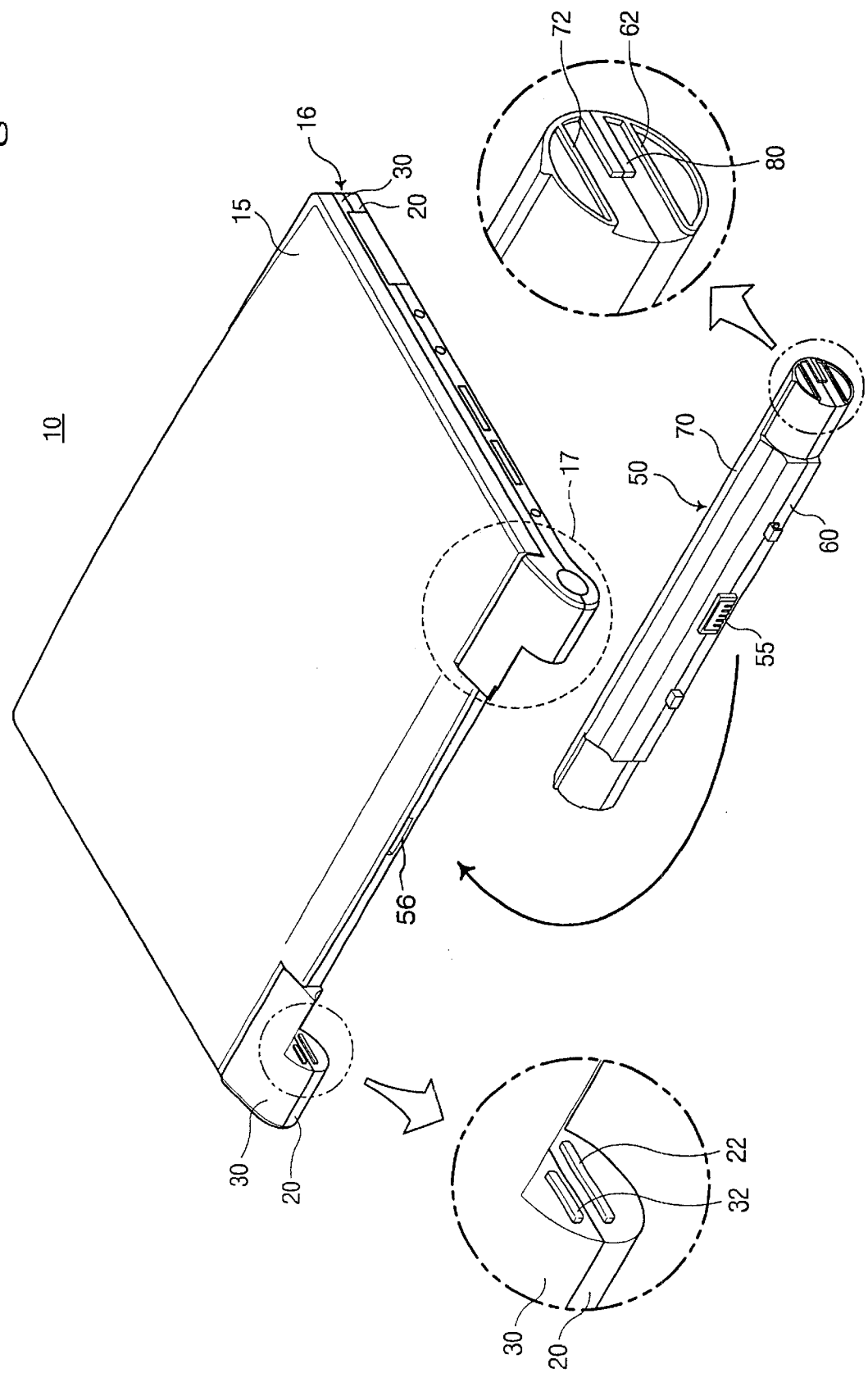
FIG. 4 is a perspective view for illustrating a portable computer with another battery coupling structure and a battery pack having another coupling member at each side end surface according to a second embodiment of the present invention.
Figure 5:
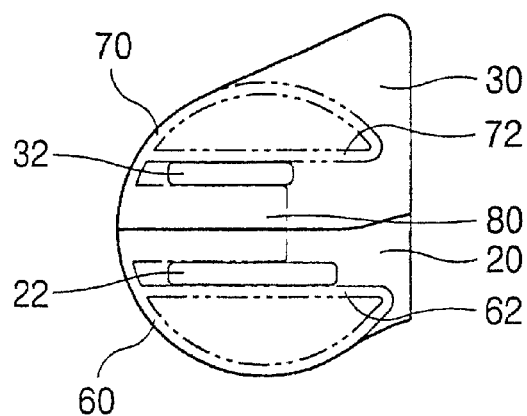
FIG. 5 is a diagram for illustrating an attachment of the battery pack to the portable computer according to the second embodiment of the present invention.

FIG. 4 is a perspective view for illustrating a portable computer with another battery coupling structure and a battery pack having another coupling member at each side end surface according to a second embodiment of the present invention and FIG. 5 is a diagram for illustrating an attachment of the battery pack to the portable computer according to the second embodiment of the present invention.

Referring to FIG. 4 and FIG. 5, a portable computer 10 according to a first embodiment of the present invention comprises a display panel 15 and a main body 16. The main body 16 is comprised of an upper housing 30 and a lower housing 20. The display panel 15 is pivotally attached on the rear portion of the upper housing 30. A pair of hinge portion 17 disposed at the rear portion of the main body 16 is spaced from each other. Each of an opposite side of the hinge portion 17 includes two protuberances 22, 32.

A battery pack 50 including an upper battery housing 70 and a lower battery housing 60 is inserted into a space between two hinge portions 17, and coupled to the main body 16 to provide a working voltage with a main body 16. The battery pack 50 has an electrical connector 55 which makes the battery pack 50 to be connected with electrical socket 56 of inner circuit board within the main body 16. On each surface of side end of the battery pack 70, two guide ribs 72, 62 are formed. A shape of the battery pack according to the first embodiment of the present invention is a circular bar, then the outer surface of the ending portion of the main body 16 is almost formed a circular shape without protruding portion at certain point when the battery pack 50 is completely coupled to the main body 16 of the portable computer 10.

In the second embodiment of the present invention, the battery pack 50 further includes a third protrusion 80. When the battery pack 50 is coupled to the main body 16, two protuberance 22 and 32 are contacted with two guide ribs 72 and 62, and the third protrusion 80 is contacted with two protuberance 22 and 32. Then the guide ribs 72, 62 enforced two protuberances 22, 32 to be adhered closely to each other. Using such a coupling way, the coupling of the battery pack 50 to the main body 16 bring the adherence of the upper housing 30 and the lower housing 20, therefore a coherence of the rear portion of the portable computer 10 is increased.

In the first embodiment of the present invention, the protuberance 32 is formed on the upper housing 30 and the protuberance 22 is formed on the lower housing 20. In such a structure, the guide rib 72 and the upper surface of the third protrusion 80 of the battery pack 50 are contacted with a protuberance 32 and the guide rib 62 of the battery pack 50 and the lower surface of the third protrusion 80 of the battery pack 50 are contacted with a protuberance 22. The length of the interval of guide rib 72 and guide rib 62 is designed according to two protuberances 32, 22 formed on the upper and lower housing. As described above, when the guide ribs 72, 62 are coupled on the hinge portion 17 of the portable computer, an engagement of the guide ribs and protuberance makes the coupling state between the portable computer 10 and the battery pack 50 firm and safe.

Figure 6:
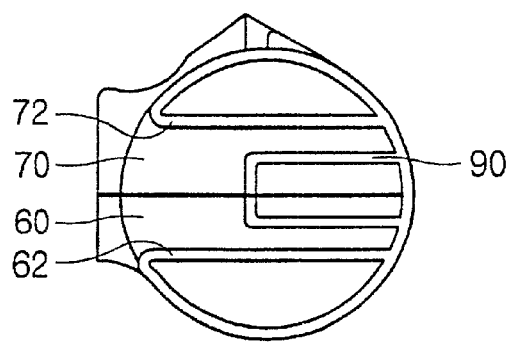
FIG. 6 is a side view of the battery pack for illustrating a modification of the third protrusion of the second embodiment of the present invention.

FIG. 6 is a side view of the battery pack for illustrating a modification of the third protrusion of the second embodiment of the present invention.

Referring to FIG. 6, it is possible that a shape of the third protrusion 80 is transformed into a projecting rib type. A third guide rib 90 is formed on each of side ends surface of the battery pack 50.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. An electronic device comprising;
   a main body including an upper housing and a lower housing;
   a display panel attached pivotally on the upper housing of the main body;
   a pair of hinge portions disposed at a rear portion of the main body and spaced apart from each other, wherein each of opposite sides of hinge portions has at least one protrusion member; and
   a battery pack incorporated to be detachable between said hinge portions, said battery pack comprising a guide rib positioned at each end of said battery pack, at least one protrusion member is formed to be coupled securely to the hinge portions at each side end of the battery pack, and the protrusion members are engaged with said guide rib when the battery pack is coupled to the main body, said battery pack squeezes together said upper housing to said lower housing when said battery pack is attached to said main body.

2. The electronic device of claim 1, wherein said each of opposite sides of said hinge portions has a first protrusion member and a second protrusion member, wherein the first protrusion member is formed on the upper housing and the second protrusion member is formed on the lower housing.

3. The electronic device of claim 1, said display panel being allowed to open and close when said battery pack is attached to said main body.

4. The electronic device of claim 3, said main body further comprises an electrical socket and said battery pack contains an electrical connector which mechanically and electrically mates with said electrical socket of said main body to supply power to said main body.

5. The electronic device of claim 4, said battery pack being a cylindrical shape.

6. A portable computer, comprising:
   a main body comprising an upper housing and a lower housing, said upper housing pivotally attached to said lower housing, said upper housing accommodating a display panel, said main body having a rear portion, a left side and a right side;
   a pair of hinge portions disposed at said rear portion of said main body, one of said pair of hinge portions disposed at said right side of said rear portion of said main body, the other of said pair of hinge portions disposed at said left side of said rear portion; and
   a battery pack that fixes onto said main body of said portable computer when said upper housing is closed onto said lower housing, said battery pack squeezes together said upper housing to said lower housing when said battery pack is attached to said main body, allowing said display panel to open and close when said battery pack is fixed to said main body of said portable computer.

7. The portable computer of claim 6, each one of said pair of hinge portions having a surface that faces each other, each face containing a pair of longitudinal projections, said longitudinal projections being parallel to each other when said upper housing is closed onto said lower housing, said battery pack being cylindrical in shape and having two end faces, each end face having a pair of longitudinal guide ribs in operational relationship with said pair of longitudinal projections so that each pair of longitudinal guide ribs squeezes together said pairs of longitudinal projections when said battery pack is installed onto said main body of said portable computer.

8. The portable computer of claim 6, said main body further comprises an electrical socket and said battery pack comprises an electrical connector which automatically mechanically and electrically mates with said electrical socket of said main body to supply power to said main body when said battery pack is installed onto said main body of said portable computer.

9. The portable computer of claim 8, each pair of longitudinal guide ribs being spaced apart slightly more than the spacing between each pair of longitudinal projections when said upper housing is attached to said lower housing.

10. The portable computer of claim 9, each pair of longitudinal guide ribs snugly fits around each pair of longitudinal projections when said battery pack is installed onto said main body of said portable computer.

11. The portable computer of claim 10, each pair of longitudinal guide ribs has a central projection disposed in between equidistant from each one of said pair of longitudinal guide ribs.

12. The portable computer of claim 11, each one of each pair of longitudinal projections is inserted between one of said pair of longitudinal guide ribs and said central projection when said battery pack is installed onto said main body of said portable computer.

13. The portable computer of claim 12, said pair of longitudinal guide ribs and said central projection are all parallel to each other.

14. The portable computer of claim 6, said display panel contains a shaft for pivoting between an open and a closed position with respect to said lower housing, said shaft being located both spacially and operationally away from where said battery pack couples to said pair of hinge portions, allowing said display panel to open and close relative to said lower housing while battery pack is fixed onto said main body of said portable computer.

15. A portable computer, comprising:
   a main body comprising an upper housing and a lower housing, said upper housing pivotally attached to said lower housing, said upper housing accommodating a display panel, said main body having a rear portion, a left side and a right side;
   a pair of hinge portions disposed at said rear portion of said main body, one of said pair of hinge portions disposed at said right side of said rear portion of said main body, the other of said pair of hinge portions disposed at said left side of said rear portion, each one of said pair of hinge portions having a surface that faces each other, each face containing a pair of longitudinal projections, said longitudinal projections being parallel to each other when said upper housing is attached to said lower housing; and a battery pack that fixes onto said main body of said portable computer when said upper housing is closed onto said lower housing, said battery pack being cylindrical in shape and having two end faces, each end face having a three of longitudinal guide ribs in operational relationship with said pair of longitudinal projections so that each longitudinal projection snugly fits between one of said pair of longitudinal guide ribs and said central projection so that each pair of longitudinal guide ribs squeezes together said pairs of longitudinal projections when said battery pack is installed onto said main body of said portable computer while allowing said display panel to open and close when said battery pack is installed onto said main body.

16. The portable computer of claim 15, said main body further comprises an electrical socket and said battery pack contains an electrical connector which automatically mechanically and electrically mates with said electrical socket of said main body to supply power to said main body when said battery pack is installed onto said main body of said portable computer.

17. The portable computer of claim 16, each pair of longitudinal guide ribs being spaced apart slightly more than the spacing between each pair of longitudinal projections when said upper housing is closed onto said lower housing.

18. The portable computer of claim 17, each pair of longitudinal projections are spaced apart slightly more than a width of said central projection.

19. The portable computer of claim 18, said pair of longitudinal guide ribs and said central projection are all parallel to each other.

20. The portable computer of claim 19, said display panel has a pivot that is separated both spacially and operationally from where said battery pack couples to said hinge portions, allowing said display panel to open and close relative to said lower housing while said battery pack is installed onto said main body of said portable computer.

* * * * *

UNITED STATES PATENT AND TRADEMARK OFFICE
CERTIFICATE OF CORRECTION

PATENT NO. : 6,385,041 B1
DATED : May 7, 2002
INVENTOR(S) : Phil-Kyu Choi

It is certified that error appears in the above-identified patent and that said Letters Patent is hereby corrected as shown below:

<u>Title page,</u>
Item [30], Foreign Application Priority Data: correct Korean priority Number from "95-1999" to -- 99-01995 --;

Signed and Sealed this

Seventeenth Day of December, 2002

JAMES E. ROGAN
*Director of the United States Patent and Trademark Office*